(12) United States Patent
El Defrawy et al.

(10) Patent No.: US 9,489,522 B1
(45) Date of Patent: Nov. 8, 2016

(54) METHOD FOR SECURE AND RESILIENT DISTRIBUTED GENERATION OF ELLIPTIC CURVE DIGITAL SIGNATURE ALGORITHM (ECDSA) BASED DIGITAL SIGNATURES WITH PROACTIVE SECURITY

(71) Applicant: HRL Laboratories, LLC, Malibu, CA (US)

(72) Inventors: Karim El Defrawy, Santa Monica, CA (US); Joshua D. Lampkins, Gardena, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/686,538

(22) Filed: Apr. 14, 2015

Related U.S. Application Data

(63) Continuation-in-part of application No. 14/207,321, filed on Mar. 12, 2014, which is a continuation-in-part of application No. 14/207,483, filed on Mar. 12, 2014.

(60) Provisional application No. 61/780,638, filed on Mar. 13, 2013, provisional application No. 61/780,757, filed on Mar. 13, 2013, provisional application No. 61/981,191, filed on Apr. 17, 2014.

(51) Int. Cl.
*G06F 21/00* (2013.01)
*G06F 21/60* (2013.01)
*H04L 9/32* (2006.01)

(52) U.S. Cl.
CPC ........... *G06F 21/606* (2013.01); *H04L 9/3218* (2013.01)

(58) Field of Classification Search
CPC ............................. G06F 21/606; H04L 9/3218
USPC ........................................................ 726/26
See application file for complete search history.

(56) References Cited

U.S. PATENT DOCUMENTS

| | | | |
|---|---|---|---|
| 4,633,470 A | 12/1986 | Welch et al. | |
| 5,625,692 A * | 4/1997 | Herzberg | H04L 9/085 380/286 |
| 7,003,677 B1 * | 2/2006 | Herzberg | H04L 9/0833 380/286 |
| 7,313,701 B2 * | 12/2007 | Frankel | G06Q 20/382 705/64 |
| 8,824,672 B1 | 9/2014 | Gomathisankaran | |
| 2010/0037055 A1 * | 2/2010 | Fazio | H04L 9/3218 713/171 |

(Continued)

OTHER PUBLICATIONS

Ibrahim, Maged H., et al. "A robust threshold elliptic curve digital signature providing a new verifiable secret sharing scheme." Circuits and Systems, 2003 IEEE 46th Midwest Symposium on. vol. 1. IEEE, 2003.*

(Continued)

*Primary Examiner* — Syed Zaidi
(74) *Attorney, Agent, or Firm* — Tope-McKay & Associates

(57) ABSTRACT

Described is system for generation of elliptic curve digital signature algorithm (ECDSA) based digital signatures. A Secret-Share protocol is initialized between a client and a set of servers to share a set of shares of a private key s among the set of servers. The set of servers initializes a protocol to generate a digital signature on a message using the set of shares of the private key s without reconstructing or revealing the private key s. The set of servers periodically initializes a Secret-Redistribute protocol on each share of the private key s to re-randomize the set of shares. A Secret-Open protocol is initialized to reveal the private key s to an intended recipient, wherein the private key s is used to compute the digital signature.

15 Claims, 6 Drawing Sheets

(56) References Cited

U.S. PATENT DOCUMENTS

| | | |
|---|---|---|
| 2012/0179911 A1 | 7/2012 | Zheng et al. |
| 2012/0254619 A1 | 10/2012 | Dhuse et al. |
| 2013/0191632 A1 | 7/2013 | Spector et al. |
| 2013/0268760 A1 | 10/2013 | Bono et al. |
| 2014/0089683 A1 | 3/2014 | Miller et al. |

OTHER PUBLICATIONS

D. Beaver. Efficient multiparty protocols using circuit randomization. In CRYPTO '91, LNCS 576, pp. 420-432, 1991.

Eli Ben-Sasson, Serge Fehr, and Rafail Ostrovsky, Near-linear unconditionally-secure multiparty computation with a dishonest minority. Cryptography ePrint Archive, Report 2011/629, 2011, pp. 1-21.

Ivan Damgard and Jesper Buus Nielsen. Scalable and unconditionally secure multiparty computation. In CRYPTO, pp. 572-590, 2007.

The Digital Signature Standard (DSS) (Federal Information Processing Standards Publication FIPS 186-4), Jul. 2013, pp. 1-130. http://nvlpubs.nist.gov/nistpubs/FIPS/NIST.FIPS.186-4.pdf.

P. Feldman. A Practical Scheme for Non-Interactive Verifiable Secret Sharing. In Proc. of the 28th IEEE Symposium on the Foundations of Computer Science, pp. 427-437, 1987.

Steven Goldfeder, Joseph Bonneau, Edward W. Felten, Joshua A. Kroll, Arvind Narayanan, "Securing Bitcoin Wallets via Threshold Signatures", pp. 1-11. This paper is currently (Apr. 7, 2014) unpublished in proceedings of a conference or journal; available at http://www.cs.princeton.edu/~stevenag/bitcoin_threshold_signatures.pdf.

Ibrahim, M.H.; Ali, I.A.; Ibrahim, I.I.; El-Sawi, A. H., A robust threshold elliptic curve digital signature providing a new verifiable sharing scheme, Circuits and Systems, 2003 IEEE 46th Midwest Symposium on , vol. 1, No., pp. 276-280, vol. 1, Dec. 30, 2003 doi: 10.1109/MWSCAS.2003.1562272.

Don Johnson, Alfred Menezes, Scott Vanstone, The Elliptic Curve Digital Signature Algorithm (ECDSA), In International Journal of Information Security, vol. 1, Issue 1, pp. 36-63, 2001.

Rafail Ostrovsky and Moti Yung. How to withstand mobile virus attacks. In Proceedings of the tenth annual ACM symposium on Principles of distributed computing, pp. 51-59. ACM Press, 1991.

Torben P. Pedersen, Non-interactive and information-theoretic secure verifiable secret sharing. In CRYPTO, vol. 576 of Lecture Notes in Computer Science, pp. 129-140. Springer, 1991.

David Schultz. Mobile Proactive Secret Sharing. PhD thesis, Massachusetts Institute of Technology, 2007, pp. 1-157.

Adi Shamir. How to share a secret. Commun. ACM, 22(11), pp. 612-613, 1979.

Hao Wang, Zhongfu Wu, Xin Tan, A New Secure Authentication Scheme Based Threshold ECDSA for Wireless Sensor Network. In Security and Management, pp. 129-133, 2006.

Working Draft, American National Standard X9.62-1998 Public Key Cryptography for the Financial Services Industry: The Elliptic Curve Digital Signature Algorithm (ECDSA), pp. 7-13, 1998.

International Search Report of the International Searching Authority for PCT/US2015/025804; date of mailing Jul. 14, 2015.

The Written Opinion of the International Searching Authority for PCT/US2015/025804; date of mailing Jul. 14, 2015.

Office Action 1 for U.S. Appl. No. 14/207,321. Date mailed: May 18, 2015.

Ham, Lein, and Changlu Lin, "Strong (n, t, n) verifiable secret sharing scheme," Information Sciences 180.16 (2010), pp. 3059-3064.

Office Action 1 Response for U.S. Appl. No. 14/207,321. Date mailed: Aug. 18, 2015.

Office Action 2 for U.S. Appl. No. 14/207,321. Date mailed: Dec. 14, 2015.

Office Action 2 Response for U.S. Appl. No. 14/207,321. Date mailed: Apr. 4, 2016.

Notice of Allowance for U.S. Appl. No. 14/207,321. Date mailed May 4, 2016.

Office Action 1 for U.S. Appl. No. 14/207,483. Date maiied: May 22, 2015.

Bai, Li, and XuKai Zou, "A proactive secret sharing scheme in matrix projection method," International Journal of Security and Networks 4.4 (2009), pp. 201-209.

Office Action 1 Respons or U.S. Appl. No. 14/207,483. Date mailed: Sep. 22, 2015.

Office Action 2 for U.S. Appl. No. 14/207,483. Date malied: Nov. 2, 2015.

Office Action 2 Response for U.S. Appl. No. 14/207,483. Date mailed: Apr. 4, 2016.

Office Action 3 for U.S. Appl. No. 14/207,483. Date mailed: May 2, 2016.

Damgard, Ivan, and Jesper Buus Nielsen. "Scalable and unconditionally secure multiparty computation," Advances in Cryptology—CRYPTO 2007. Springer Berlin Heidelberg, 2007, pp. 572-590.

International Preliminary Report on Patentability for PCT/UIS2015/025804; date of mailing Mar. 17, 2016.

Ibrahim, Maged H., et al. "A robust threshold elliptic curve digital signature providing a new verifiable secret sharing scheme " Circuits and Systems. 2003 IEEE 46th Midwest Symposium on. vol. I. IEEE, 2003, pp. 277-279.

Alfred V. Aho, John E. Hoperoft, and J. D. Ullman. The Design and Analysis of Computer Algorithms, Addison-Wesley, 1974 pp. 299-300.

Christian Cachin, Klaus Kursawe, Anna Lysyanskaya, and Reto Strobl. Asynchronous verifiable secret sharing and proactive cryptosystems. In ACM Conference on Computer and Communications Security, pp. 88-97, 2002.

Ivan Damgard and Jesper Buus Nielsen. Scalable and unconditionally secure multiparty computation. In CRYPTO, pp. 572-690,2007.

Yvo Desmedt and Sushil Jajodia. Redistributing secret shares to new access structures and its applications. Jul. 1997. Technical Report ISSE TR-97-01, George Mason University.

Amir Herzberg, Stanislaw Jarecki, Hugo Krawczyk, and Moti Yung. Proactive secret sharing or: How to cope with perpetual leakage. In CRYPTO, pp. 39-352, 1995.

Torben P. Pedersen. Non-interactive and information-theoretic secure verifiable secret sharing. In Joan Feigenbaum, editor, CRYPTO, vol. 576 of Lecture Notes in Computer Science, pp. 129-140. Springer, 1991.

David Schultz. Mobile Proactive Secret Sharing. PhD thesis, Massachusetts Institute of Technology. 2007.

Adi Shamir. How to share a secret. Commun. ACM. 22(11):612-613, 1979.

Theodore M. Wang, Chenxi Wang, and Jeannette M. Wing. Verifiable secret redistribution for archive system. In IEEE Security in Storage Workshop, pp. 94-106, 2002.

Lidong Zhou, Fred B. Schneider, and Robbert van Renesse. Apss: proactive secret sharing in asynchronous systems ACM Trans. lnf. Syst. Secur., 8(3):259-286, 2005.

Eli Ben-Sasson, Serge Fehr, and Rafaii Ostrovsky. Near-linear unconditionally-secure multiparty computation with a dishonest minority. Cryptology ePrint Archive, Report 2011/629, 2011.

Zuzana Beerliova-Trubiniova and Martin Hirt. Efficient multi-party computation with dispute control. In TCC, pp. 305-328, 2006.

Ivan Damg_ard and Jesper Buus Nielsen. Scalable and unconditionally secure multiparty computation. In CRYPTO, pp. 572-690, 2007.

Amir Herzberg, Stanislaw Jarecki, Hugo Krawczyk, and Moti Yung. Proactive secret sharing or: How to cope with perpetual leakage. In CRYPTO, pp. 339-352, 1995.

Rafail Ostrovsky and Moti Yung. How to withstand mobile virus attacks. In In Proceedings of the tenth annual ACM symposium on Principles of distributed computing, pp. 51-59. ACM Press, 1991.

Adi Shamir. How to share a secret. Commun. ACM. 22(11):612-613, 1979

Alfred V. Aho, John E. Hopecroft, and J. D. Ullman. The Design and Analysis of Computer Algorithms. Addison-Wesley, pp. 299-300, 1974.

* cited by examiner

US 9,489,522 B1

METHOD FOR SECURE AND RESILIENT DISTRIBUTED GENERATION OF ELLIPTIC CURVE DIGITAL SIGNATURE ALGORITHM (ECDSA) BASED DIGITAL SIGNATURES WITH PROACTIVE SECURITY

CROSS-REFERENCE TO RELATED APPLICATIONS

This is a Continuation-in-Part Application of U.S. Non-Provisional application Ser. No. 14/207,321, filed Mar. 12, 2014, entitled, "System and Method for Mobile Proactive Secret Sharing," which is a Non-Provisional Application of U.S. Provisional Patent Application No. 61/780,638, filed Mar. 13, 2013, entitled, "An Efficient Protocol for Mobile Proactive Secret Sharing," the entirety of which are hereby incorporated by reference.

This is ALSO a Continuation-in-Part Application of U.S. Non-Provisional application Ser. No. 14/207,483, filed Mar. 12, 2014, entitled, "System and Method for Mobile Proactive Secure Multi-Party Computation (MPMPC) Using Commitments," which is a Non-Provisional Application of U.S. Provisional Application No. 61/780,757, filed on Mar. 13, 2013, entitled, "Efficient Protocol for Mobile Proactive Secure Multiparty Computation (MPMPC) Using Commitments," the entirety of which are hereby incorporated by reference.

This is ALSO a Non-Provisional Application of U.S. Provisional Patent Application No. 61/981,191, filed Apr. 17, 2014, entitled, "A Method for Secure and Resilient Distributed Generation of Elliptic Curve Digital Signature Algorithm (ECDSA) Based Digital Signatures with Proactive Security," the entirety of which is hereby incorporated by reference.

BACKGROUND OF INVENTION (1) Field of Invention

The present invention relates to a system for generating Elliptic Curve Digital Signature Algorithm (ECDSA) based digital signatures and, more particularly, to a system for generating ECDSA based digital signatures in a distributed manner.

(2) Description of Related Art

Digital signatures are essential to the operation of secure distributed systems, and authentication and access control. Elliptic Curve Digital Signature Algorithm (ECDSA) based digital signatures, for example, are used to ensure integrity of transmitted data online, can be used for authentication of data and entities online, and are also used in a variety of digital currency and financial transactions.

There are a few previous approaches which describe generation of digital signatures for secure systems. In Literature Reference No. 15 of the List of Incorporated Literature References, the protocols and algorithms consider only passive adversaries and do not provide proactive security. Passive adversaries are only able to spy on corrupted nodes as opposed to malicious adversaries, which are able to spy on corrupted nodes and cause them to send arbitrary messages as the adversary desires. Proactive security enables the storing of information in a secure, distributed fashion in a hostile environment. In Literature Reference No. 8, the protocols and algorithms consider a threshold of n/3 for malicious adversaries and do not provide proactive security.

Thus, a continuing need exists for as set of protocols to proactivize the computation and storage of digital signatures with a higher threshold of servers that can be corrupted or compromised while still maintaining confidentiality and correctness of the digital signature.

SUMMARY OF THE INVENTION

The present invention relates to a system for generating Elliptic Curve Digital Signature Algorithm (ECDSA) based digital signatures and, more particularly, to a system for generating ECDSA based digital signatures in a distributed manner. The system comprises one or more processors and a memory having instructions such that when the instructions are executed, the one or more processors perform multiple operations. A Secret-Share protocol is initialized between a client C and a set of n servers, wherein the client C shares a set of shares of a private key s among the set of n servers. The set of n servers initializes a protocol to generate a digital signature on a message m using the set of shares of the private key s without reconstructing or revealing the private key s. The set of n servers periodically initializes a Secret-Redistribute protocol on each share of the private key s to re-randomize the set of shares.

In another aspect, a Secret-Open protocol is initialized to reveal the private key s to an intended recipient, wherein the private key s is used to compute the digital signature.

In another aspect, in order for an adversary to retrieve the private key s, the adversary must compromise a plurality of servers in the set of n servers.

In another aspect, a threshold t of up to n/2 of the set of n servers can be completely corrupted while the confidentiality of the private key s and correctness of the digital signature remain uncompromised.

In another aspect, if a majority of the set of shares of the private key s is not corrupted, then the set of n servers jointly restore any corrupted shares.

In another aspect, corrupted servers are restored to an uncorrupted state.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
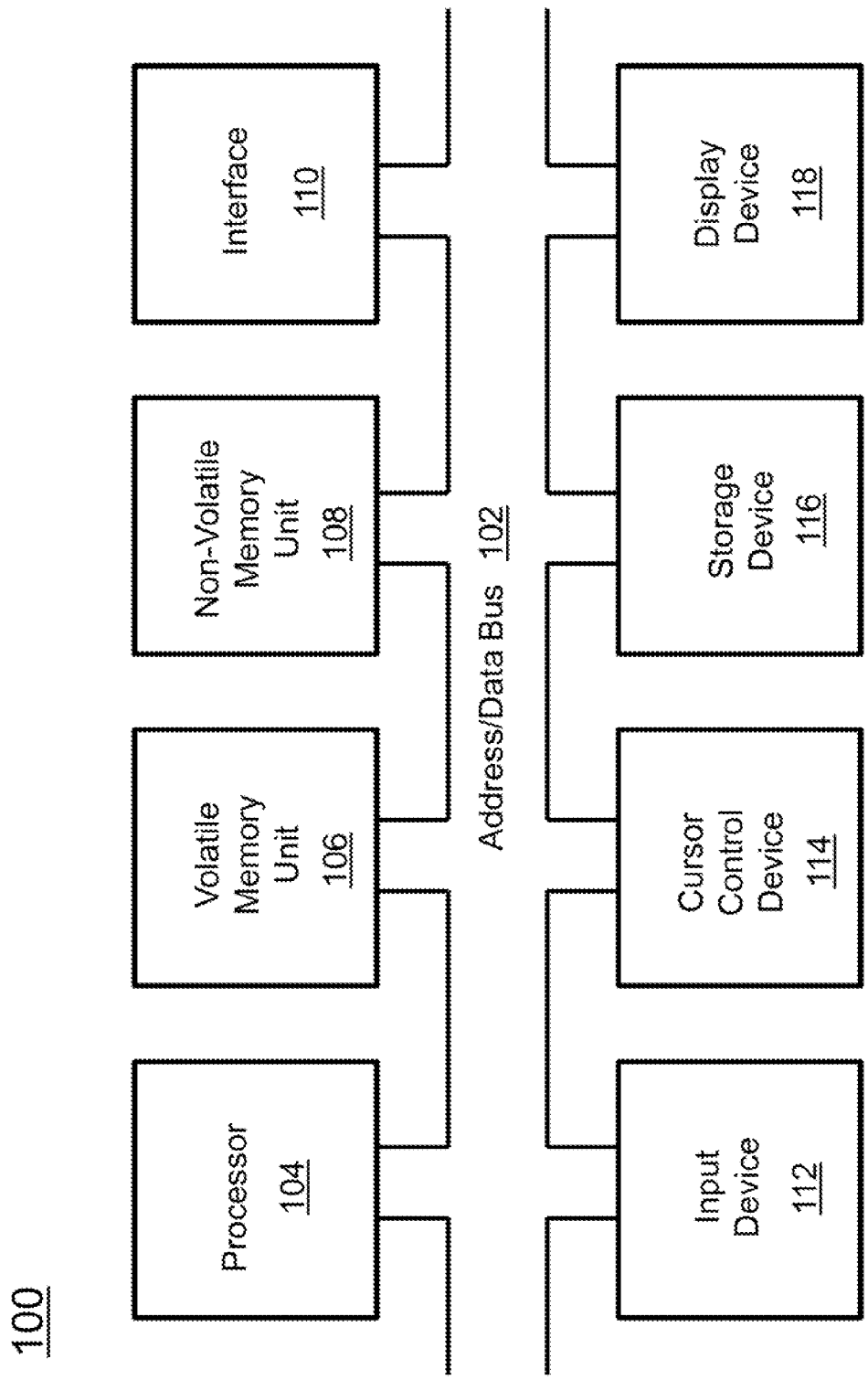
FIG. 1 is a block diagram depicting the components of a system for generating Elliptic Curve Digital Signature Algorithm (ECDSA) based digital signatures according to the principles of the present invention.

The present invention relates to a system for generating Elliptic Curve Digital Signature Algorithm (ECDSA) based digital signatures and, more particularly, to a system for generating ECDSA based digital signatures in a distributed manner. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Finally, specific details of the present invention are provided to give an understanding of the specific aspects.

(1) List of Incorporated Literature References

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:

1. D. Beaver. Efficient multiparty protocols using circuit randomization. In CRYPTO '91, LNCS 576, pp. 420-432, 1991.

2. Eli Ben-Sasson, Serge Fehr, and Rafail Ostrovsky. Near-linear unconditionally-secure multiparty computation with a dishonest minority. Cryptology ePrint Archive, Report 2011/629, 2011.

3. Zuzana Beerliova-Trubiniova and Martin Hirt. Efficient multi-party computation with dispute control. In TCC, pages 305-328, 2006.

4. Ivan Damgard and Jesper Buus Nielsen. Scalable and unconditionally secure multiparty computation. In CRYPTO, pages 572-590, 2007.

5. Federal Information Processing Standards Publication. The Digital Signature Standard (DSS) (FIPS 186-4).

6. P. Feldman. A Practical Scheme for Non-Interactive Verifiable Secret Sharing. In Proc. Of the 28th IEEE Symposium on the Foundations of Computer Science, pages 427-437, 1987.

7. Steven Goldfeder, Joseph Bonneau, Edward W. Felten, Joshua A. Kroll, Arvind Narayanan, "Securing Bitcoin Wallets via Threshold Signatures".

8. Ibrahim, M. H.; Ali, I. A.; Ibrahim, I. I.; El-Sawi, A. H., A robust threshold elliptic curve digital signature providing a new verifiable secret sharing scheme, Circuits and Systems, 2003 IEEE 46th Midwest Symposium on, vol. 1, no., pp. 276, 280 Vol. 1, 30-30 Dec. 2003.

9. Amir Herzberg, Stanislaw Jarecki, Hugo Krawczyk, and Moti Yung. Proactive secret sharing or: How to cope with perpetual leakage. In CRYPTO, pages 339-352, 1995.

10. Don Johnson, Alfred Menezes, Scott Vanstone, The Elliptic Curve Digital Signature Algorithm (ECDSA), In International Journal of Information Security, Volume 1, Issue 1, pages 36-63, 2001.

11. Rafail Ostrovsky and Moti Yung. How to withstand mobile virus attacks. In Proceedings of the tenth annual ACM symposium on Principles of distributed computing, pages 51-59. ACM Press, 1991.

12. Torben P. Pedersen. Non-interactive and information-theoretic secure verifiable secret sharing. In CRYPTO, volume 576 of Lecture Notes in Computer Science, pages 129-140. Springer, 1991.

13. David Schultz. Mobile Proactive Secret Sharing. PhD thesis, Massachusetts Institute of Technology, 2007.

14. Adi Shamir. How to share a secret. Commun. ACM, 22(11):612-613, 1979.

15. Hao Wang, Zhongfu Wu, Xin Tan. A New Secure Authentication Scheme Based Threshold ECDSA For Wireless Sensor Network. In Security and Management, pages 129-133, 2006.

16. Working Draft, American National Standard X9.62-1998 Public Key Cryptography For The Financial Services Industry: The Elliptic Curve Digital Signature Algorithm (ECDSA), pgs. 7-13, 1998.

(2) Principal Aspects

The present invention has three "principal" aspects. The first is a system for generating Elliptic Curve Digital Signature Algorithm (ECDSA) based digital signatures and, more particularly, to a system for generating ECDSA based digital signatures in a distributed manner. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal, aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track -pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory -storage devices.

Figure 2:
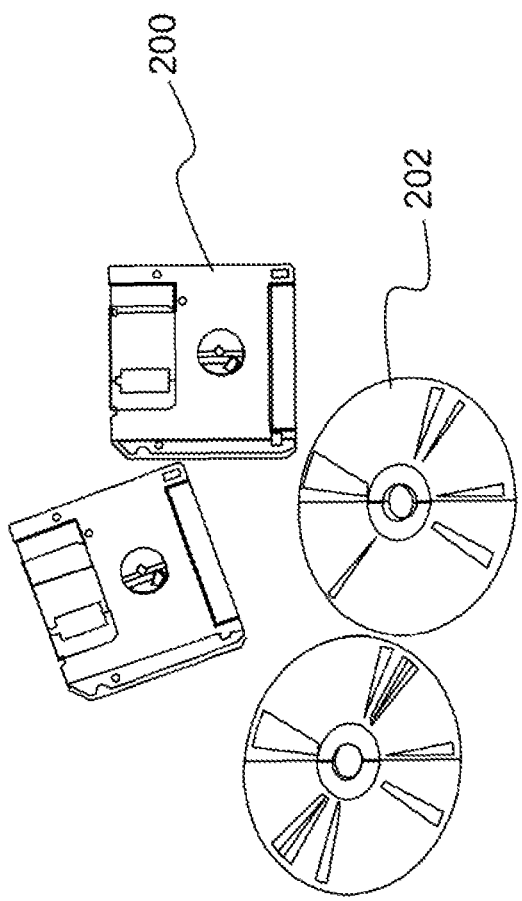
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of the Invention

Described is a system that allows a group of servers to digitally sign messages on behalf of a client. Messages are signed using the Elliptic Curve Digital Signature Algorithm (ECDSA). The ECDSA is described in Literature Reference No. 6. ECDSA signatures are generated using a private key, and signatures are verified using a corresponding public key. The signature on a message m using private key s is denoted as ECDSA_s (m). The algorithm is such that anyone holding the public key can easily verify that ECDSA_s (m) is a signature on message m, but no one can generate ECDSA_s (m) without knowing s.

Figure 3:
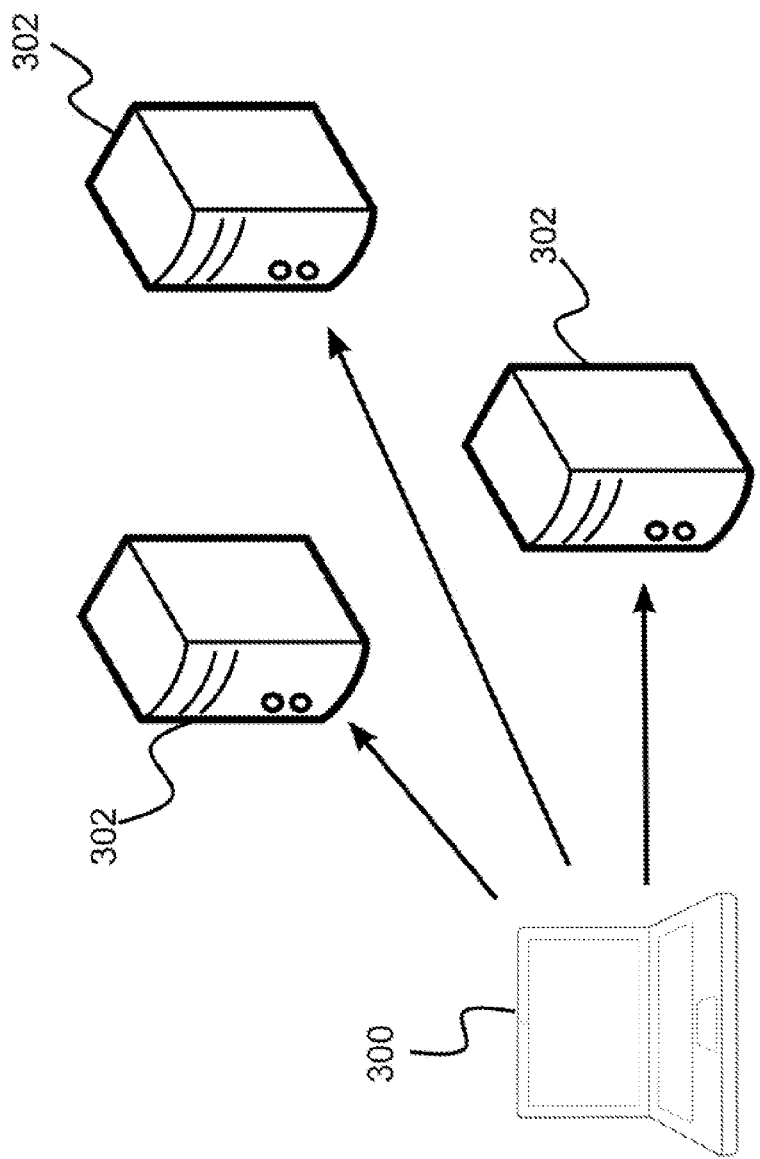
FIG. 3 is an illustration of a client uploading shares of a private key s to a set of servers according to the principles of the present invention.
Figure 4:
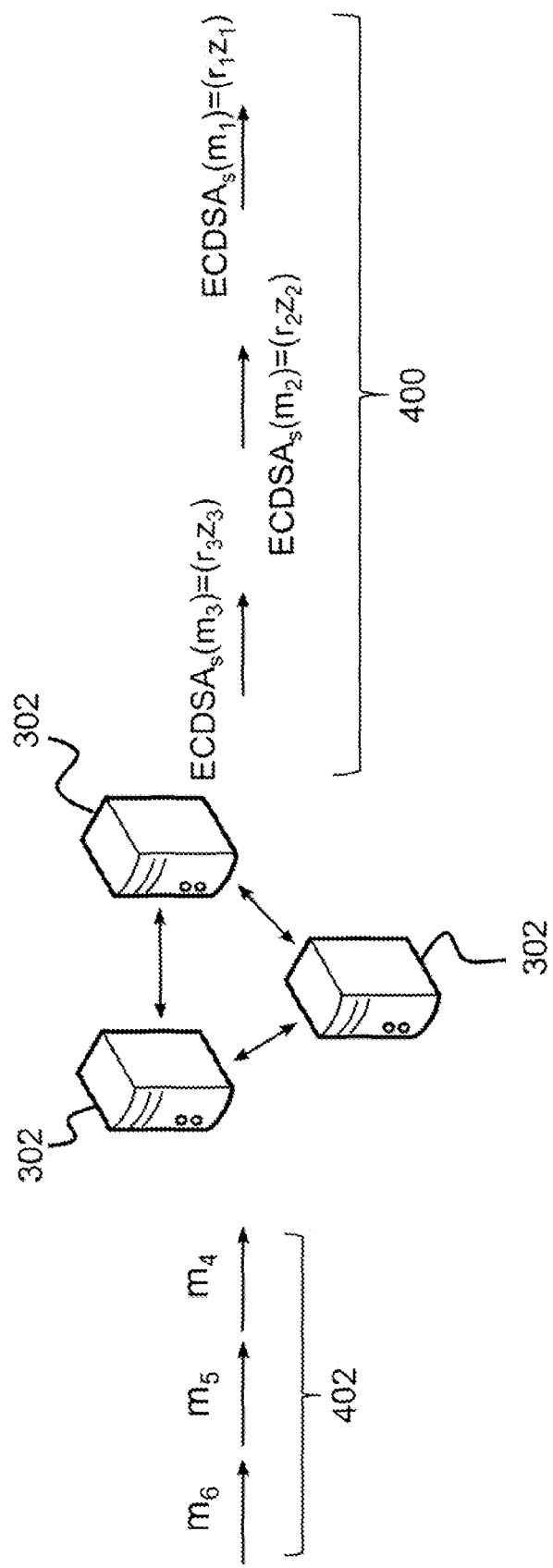
FIG. 4 is an illustration of the set of servers generating signatures on messages using their shares of the private key s without revealing the private key s according to the principles of the present invention.
Figure 5:
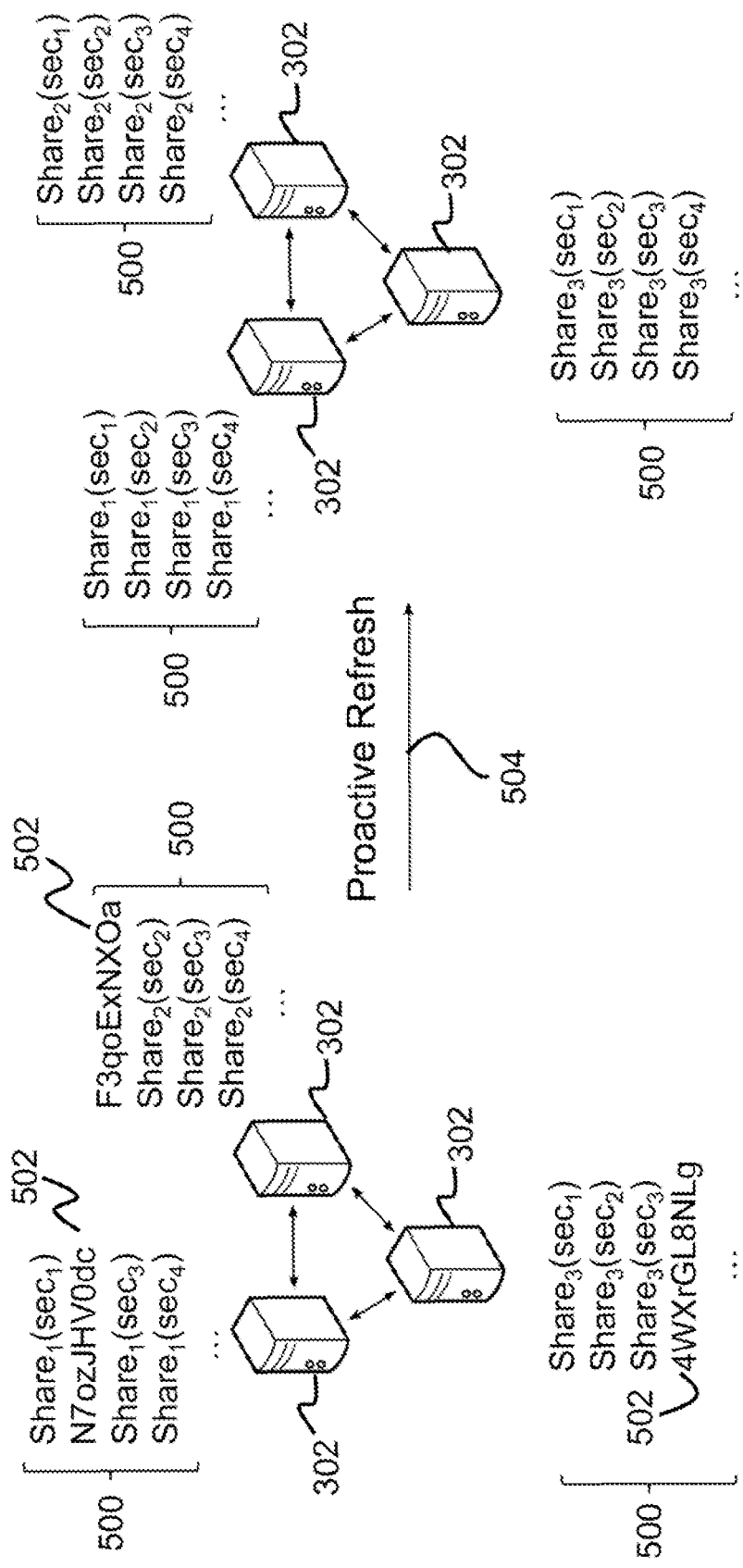
FIG. 5 is an illustration of the set of servers periodically performing a Proactive-Refresh protocol to correct any shares that may have been corrupted according to the principles of the present invention.

A client 300 (computer hardware or software) first uploads shares of his/her private key s to a set of servers 302 using a secret sharing algorithm, as shown in FIG. 3. This is done such that an adversary can learn the private key s only if he/she learns a majority of the shares. The servers 302 can then use their shares to jointly generate signatures 400 on messages 402 without reconstructing or revealing the private key, as depicted in FIG. 4. As shown in FIG. 5, over the course of the protocol, some of the shares in the sets of shares 500 may become corrupted (forming corrupted shares 502), either due to accidental faults or malicious behavior. Thus, the servers 302 periodically perform a Proactive -Refresh protocol 504 to correct any shares that may have been corrupted. So long as the majority of shares 500 of any given private key are not corrupted, this will allow the servers 302 to jointly restore corrupted shares 502 to an uncorrupted state.

Described are algorithms and protocols that allow a set of n servers to generate ECDSA based digital signatures in a distributed manner with the following security and resilience guarantees. A threshold (t) of up to n/2 (i.e., t<n/2), of the n servers can be maliciously and completely corrupted or compromised, and the confidentiality of the private key used to generate the signature will not be compromised. Furthermore, the correctness of the generated signature will not be compromised. Correctness of a digital signature is defined in Literature Reference No. 10.

Additionally, the distributed (secret shared) private key used to generate the ECDSA signature is periodically refreshed to ensure long term security against mobile adversaries (i.e., the protocols implement proactive security guarantees). Proactive security is also guaranteed against malicious adversaries, not only passive or semi-honest ones. Malicious adversaries are able to spy on corrupted nodes and cause them to send arbitrary messages as the adversary desires. For the purposes of the present invention, proactive security means that the system is secure in the presence of a mobile adversary which may eventually corrupt all of the nodes (or servers), although no more than a threshold number may be corrupt at any given time. Each of these aspects will be described in further detail below.

(3.1) Preliminaries

Below is a table of symbols used in the protocols described herein.

| | Table of Symbols |
|---|---|
| P | The set of servers currently on-line and engaged in the protocol. |
| n | The number of servers currently engaged in the protocol. |
| t | The maximum number of servers that a malicious party can corrupt per stage without revealing the secret. This is called the threshold of corruption. |
| C | The client on behalf of whom the servers store the private key. |
| s | The private key used to sign messages. |
| d | The degree of the polynomial used to share the secret. |
| Corr | The set of servers known by every server to be corrupt |
| g, h | Group elements used for Pedersen commitments, where g is an element of order q in an elliptic curve, and h is an element for which no servers know $\log_g$ (h). |

Let n denote the number of servers, and denote the set of servers by $P=\{P_i\}_{i=1}^n$. The private keys are redistributed (i.e., refreshed) periodically. The period between adjacent redistributions is called a stage. Also, the period before the first redistribution is a stage, and the period after the last redistribution is a stage. Let t denote the threshold of corruption (i.e., the maximum number of servers an adversary may corrupt during the current stage). The adversary may adaptively corrupt and de-corrupt servers at will, so long as the number of corruptions per stage does not exceed the threshold. Any server that is corrupt during a secret redistribution is considered to be corrupt in both adjacent stages. It is required that t<n/2 at each stage. Let Corr denote the set of servers that are known by everyone to be corrupt; it is initially assumed that Corr=.

Assume a synchronous network model with a secure broadcast channel. Point-to-point communications will not be used in the protocol descriptions, although any implementation of the protocols would likely emulate a broadcast channel over point-to-point channels using a broadcast protocol. Secure erasure is also assumed, meaning that each server can erase its data in such a way that if the adversary later corrupts that server, the adversary cannot feasibly learn any information on what was erased.

The secret sharing scheme used in the system according to the principles of the present invention is based on Shamir's secret sharing scheme (see Literature Reference No. 14 for a description of Shamir's secret sharing scheme) in which the shares of a secret (the private key in the ECDSA case described here) are points on a polynomial, the constant term of the polynomial being the secret. Denote by d the degree of the polynomial used to distribute the secret. Therefore, knowing any d+1 points on the polynomial allows one to interpolate the secret, but knowing d or fewer points does not reveal any information about the secret. For the polynomials that store the private keys, set d=t is set.

Secrets will be shared using Pedersen commitments (which are described in Literature Reference No. 12) and, in sonic instances, Feldman commitments (which are described in Literature Reference No. 6). To that end, let q be a large prime, and let g be an element of order q over some elliptic curve such that the discrete logarithm assumption holds for <g> (where <g> is the group generated by g). Furthermore, let h∈<g> such that no server 302 knows the discrete logarithm of h. That is, no server 302 knows k∈$Z_q$ such that kg=h. If one wants to share a secret with polynomial μ∈$Z_q$[x] (i.e., μ(0) is the secret), then an auxiliary polynomial ν∈$Z_q$[x] is also created. Letting $α_i$ denote the evaluation point of $P_i$, each server $P_i$ receives his share $\mu\alpha_i$ of the secret, together with $v\alpha_i$. Let $\mu_k$ denote the coefficient of $x^k$ in $\mu_x$ (and similarly for $v_k$). Then, when the secret is shared, the values $\mu_k g + v_k h$—called Pedersen commitments—are broadcast for each k. This means that $\mu(\alpha_i)g+v(\alpha_i)h$ are also public knowledge (as they can computed from the $\mu_k g+v_k h$). This allows servers to verify that the shares they received are consistent with the commitments broadcast by the dealer. Feldman commitments are the same as Pedersen commitments, except that the auxiliary polynomial is zero.

It is assumed that each server has a public key encryption scheme, and the encryption of MESSAGE for server $P_i$ is denoted $ENC_{P_i}$(MESSAGE). Each server also has a public key signature scheme, and $P_i$'s signature on MESSAGE is denoted as $SIG_{P_i}$(MESSAGE). RAND is used to denote an arbitrary random value.

(3.2) System Overview

Figure 6:
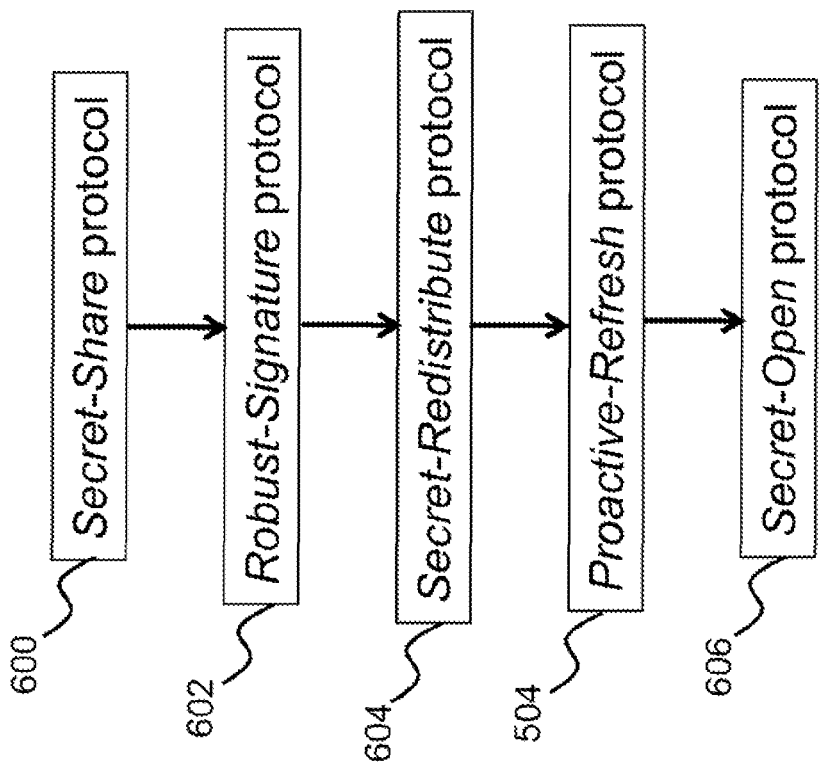
FIG. 6 is a flow diagram illustrating distributed generation of elliptic curve digital signature algorithm (ECDSA) based digital signatures with proactive security according to the principles of the present invention.

The system operates as follows, as shown in FIG. 6. The client C distributes a sharing of his/her private key s among the servers by executing a Secret-Share protocol 600 (t,C, s,P∪{C},Corr) with the servers. After this initial setup has been done, the servers may run instances of a Robust-Sig-Gen protocol (Robust -Signature protocol 602 in FIG. 6) (t,P,Corr,[s],m) or a Client-Sig-Gen protocol (t,P,Corr,C,[s], m) to generate a signature on message m. The question of which messages will be signed at what time may be determined by interaction with the client, or may occur according to some pre-determined schedule, or any trigger or signal from another trusted system.

The servers periodically run a Secret-Redistribute protocol 604 (t,P,Corr,[s]) on each sharing [s] of a private key in order to re-randomize the sharings, thereby preserving privacy of the stored values and ensuring long-term confidentiality. The redistribution will be performed according to some pre-determined schedule (e.g., every night at midnight) or in response to any outside or inside trusted signal or trigger (e.g., in response to a command by a system administrator). The present invention provides the protocols and algorithms to perform such a redistribution; when and why the redistribution is performed can be determined by various other means and all could be seamlessly integrated with the system according to the principles of the present invention.

The servers 302 periodically perform the Proactive-Refresh protocol 504 to correct any shares that may have been corrupted. Finally, a Secret-Open protocol 606 is initialized to reveal the private key s to an intended recipient, wherein the private key s is used to compute the digital signature.

(3.3) The Robust Signature Generation Protocol

Below is a description of the signing algorithm of the standard ECDSA signature scheme (i.e., that which is computed on a single server and where the private key s is not shared among multiple servers). The standard ECDSA signature scheme is described in Literature Reference Nos. 5 and 10.

To generate a signature on message m, the signer has to perform the following, as described in Literature Reference Nos. 5 and 10:

1. Compute e=SHA−1(m) and convert to an integer using the approach in Literature Reference No. 16.
2. Select a random integer k such that 1≤k≤q−1.
3. Compute $(x_1, y_1)$=k.g.
4. Convert $x_1$ to an integer using the approach in Literature Reference No. 16. Compute r=$x_1$ mod q. If r=0, return to step 2.
5. Compute z=$k^{-1}$(e+sr) mod q. If z=0, return to step 2.

6. The signature over a message m using the key s is the pair (r,z) (i.e., $ECDSA_s$(m)=(r,z).

The following protocol allows the servers to generate an ECDSA signature from a sharing of a private key without reconstructing and revealing the private key. The protocol uses subprotocols that are defined below.

(3.3.1) Robust-Sig-Gen (t,P,Corr,[s],m)

To generate a signature on message m (known to all the n servers) with private key s, perform the following:

1. Each server computes e=SHA−1(m) and converts e to an integer using the approach in Literature Reference No. 16.
2. The n servers execute GenPoly (t,P,Corr,1,d) to generate a sharing of a secret random value [v] with Pedersen commitments, and in parallel, the servers execute the Feldman version of GenPoly (t,P,Corr,1,d) to generate a sharing of a secret random value [k] with Feldman commitments.
3. Let $(x_1, y_1)$ denote k.g which is the commitment to the constant coefficient of the sharing of [k] generated in the invocation of the GenPoly protocol (which is known to each server). Convert $x_1$ to an integer using the approach in Literature Reference No. 16.
4. Set r=$x_1$ mod q. If r=0 go to step 2.
5. The servers compute [vk]←Multiply(t,P,Corr,[v],[k]).
6. The servers run Secret-Open (t,P,[vk]) to reveal vk. If vk=0, then go to step 2.
7. The servers locally compute $[k^{-1}]=(vk)^{-1}[v]$ mod q.
8. The servers compute [w] ←Multiply(t,P,Corr,[s],$[k^{-1}]$).
9. The servers locally compute $[z]=[k^{-1}]e+[w]r$ so that the shared value is $z=k^{-1}(e+rs)$ mod q.
10. The servers run Secret-Open (t,P,[z]) to reveal z. If z=0 go to step 2.
11. The final ECDSA signature under the shared private key s is:

$$ECDSA_s(m)=(r,z).$$

The communication complexity of the Robust-Sig-Gen protocol is $O(n^2)$ (measured as the number of broadcast field elements). It takes 35 rounds of communication (except with negligible probability). The following Client-Sig -Gen protocol is similar to the Robust-Sig-Gen protocol in that it allows the servers to generate an ECDSA signature using a sharing of the private key. It differs in that the client C (on behalf of whom the servers are storing the private key) interacts with the servers, allowing for increased efficiency.

(3.3.2) Client-Sig-Gen (t,P,Corr,C,[s],m)

To generate a signature for client C on message m with private key s, perform the following:

1. The client C computes e=SHA−1(m) and converts e to an integer using the approach in Literature Reference No. 16.
2. The client broadcasts e to the servers.
3. The client selects 3 random values α, b, and k≠0 from $Z_q$ and computes $k^{-1}$ and c=αb. The client chooses these values so that the values r and z defined in steps 6 and 11 (respectively) are both non-zero.
4. The client and the servers execute 4 instances of the Secret-Share protocol (t,C,s,P∪{C},Corr) to generate sharings of α, b, c, and $k^{-1}$. If the client is found to be corrupt during execution, the protocol terminates.
5. The client broadcasts k.g=$(x_1, y_1)$. Convert $x_1$ to an integer using the approach in Literature Reference No. 16.
6. Set r=$x_1$ mod q. If r=0, the protocol terminates.
7. The servers locally compute [α]=[s]+[α] and [β]=$[k^{-1}]$+[b].
8. The servers invoke the Secret-Open protocol (t,P,[α]) and the Secret-Open protocol (t,P,[β]) in parallel.

9. The servers locally compute $[w] \leftarrow \alpha\beta - \alpha[b] - \beta[\alpha] + [c]$.

10. The servers locally compute $[z] = [k^{-1}]e + [w]r$, so that the shared value is $z = k^{-1}(e+rs) \mod q$.

11. The servers run the Secret-Open protocol $(t, P, [z])$ to reveal $z$. If $z=0$, the protocol terminates.

12. The final ECDSA signature under the shared key $s$ is: $ECDSA_s(m) = (r,z)$.

The communication complexity of the Client-Sig-Gen protocol is $O(n)$. If the client is uncorrupted, it takes 7 rounds of communication.

(3.4) Secret Sharing, Redistribution, and Opening

Modified versions of the Secret-Share protocol, the Gen-Poly protocol, the Secret-Redistribute protocol, and the Secret-Open protocol from U.S. patent application Ser. No. 14/207,321, which is hereby incorporated by reference as though fully set forth herein, were used. These will implement basic tasks pertaining to secret sharing. For completeness, the details of those protocols are outlined below.

A sharing of a secret $s$ is denoted by $[s]$. Note that the servers can perform affine operations on secrets locally by performing the corresponding operations on their shares. For instance, suppose secrets $s^{(1)}, \ldots, s^{(l)}$ have been shared and the servers want to compute a sharing of $r = \alpha^{(0)} + \sum_{j=1}^{l} \alpha^{(j)} s^{(j)}$ for some publicly known constants $\alpha^{(0)}, \ldots, \alpha^{(l)}$. Writing server $P_i$'s share of $s(j)$ as $s_i^{(j)}$, $P_i$ can compute his share $r_i$ of $r$ as $r_i = \alpha^{(0)} + \sum_{j=1}^{l} \alpha^{(j)} s_i^{(j)}$. If all the servers perform this operation locally, this operation is written as $[r] = \alpha^{(0)} + \sum_{j=1}^{l} \alpha^{(j)} [s^{(j)}]$. Since Pedersen commitments are used, these operations also have to be performed for the auxiliary polynomial, and corresponding operations must be performed on the commitments to each polynomial.

(3.4.1) Secret Sharing

The following protocol allows a dealer $P_D$ to share a secret $s$ using Pedersen commitments. Also described is a variant of the protocol that uses Feldman commitments, which is equivalent to a Pedersen commitment in which the auxiliary polynomial is zero. Whenever this protocol (or the GenPoly protocol below) is invoked, it is assumed the Pedersen version is used, unless it is explicitly stated that the Feldman version is used.

Secret-Share $(t, P_D, s, P, Corr)$

1. Share/Commitment Distribution 1.1 $P_D$ picks a random degree $d-1$ polynomial $\tilde{\mu}(x)$ and sets $\mu(x) = s + x\tilde{\mu}(x) = \mu_0 + \mu_1(x) + \ldots + \mu_d x^d$. $P_D$ also picks a random degree $d$ polynomial $v(x) = v_0 + v_1 x + \ldots + v_d x^d$. If this is the Feldman version of the protocol, it is required that $v$ be the all-zero polynomial.

1.2 $P_D$ computes $\epsilon_k = \mu_k g + v_k h$ for each $k = 0, \ldots, d$ and broadcasts $$VSS_{P_D} = (D, \{ENC_{P_i}[\mu(\alpha_i), v(\alpha_i)]\}_{i=1}^n, \{\epsilon_k\}_{k=0}^d)$$

as well as $$SIG_{P_D}(VSS_{P_D}).$$

2. Error Detection 2.1 Each $P_i \notin Corr$ decrypts the message sent by $P_D$ to find $\mu(\alpha_i), v(\alpha_i)$ and verifies that $\mu(\alpha_i)g + v(\alpha_i)h \overset{?}{=} \sum_{k=0}^{d} \alpha_i^k \epsilon_k$. If this is the Feldman version of the protocol, $P_i$ also verifies that $v(\alpha_i) = 0$.

2.2 Any $P_i \notin Corr$ who detected a fault in step 2.1 broadcasts $$ACC_{P_i} = (i, accuse, D, RAND)$$

and $$SIG_{P_i}(ACC_{P_i}).$$

2.3 For each properly signed accusation (from server $P_i$) made in step 2.2, $P_D$ broadcasts $$(D, defense, i, [\mu(\alpha_i), v(\alpha_i)], RAND_i),$$

where $RAND_i$ is the randomness that was used to encrypt the message for $P_i$ in step 1.2.

2.4 Each server checks to see if the defenses broadcast in step 2.3 are correct (i.e., the defense was well-formed, the pair encrypts to the same message broadcast in step 1.2 when the given randomness is used, and the pair passes the checks in step 2.1). For each accusation that was rebutted with a correct defense, the accuser is added to Corr. If any accusation was not correctly rebutted, $P_D$ is added to Corr. If $P_D$ is not found to be corrupt, the protocol terminates successfully.

The communication complexity of the Secret-Share protocol is $O(n)$ field elements. It takes three rounds of communication. Multiple instances of the Secret-Share protocol can be run in parallel without affecting the round complexity. Note that the protocol does not necessarily terminate successfully if the dealer is corrupt.

(3.4.2) Generating Random Polynomials

Let $V$ be a Vandermonde matrix with $n$ rows and $n-t$ columns, and let $M = V^T$. Suppose that $x$ is an n-dimensional vector with $n-t$ of its coordinates having a uniformly random distribution and the other $t$ coordinates having an arbitrary distribution independent of the $n-t$ coordinates. It was shown in Literature Reference No. 4 that under these assumptions, all the coordinates of $Mx$ have a uniformly random distribution. It is assumed that there is a publicly known $M$, fixed for each stage of the protocol.

Described below is a protocol for creating $l$ random polynomials with Pedersen commitments in parallel. As with the Secret-Share protocol, also described is a Feldman version. This protocol generates polynomials of degree $D$. Note that one may have $D \neq d$.

GenPoly $(t, P, Corr, l, D)$

1. Proposal Distribution 1.1 $l' = \lceil l/(n-t) \rceil$ is defined. Each server $P_i \notin Corr$ generates $2l'$ random polynomials $\{(Q_i^{(k)}, y_i^{(k)}\}_{k=1}^{l'}$ with deg $Q_i^{(k)} = \deg y_i^{(k)} = D$. $Q_i^{(k)}(x) = q_{i,0}^{(k)} + q_{i,1}^{(k)} x + \ldots + q_{i,D}^{(k)} x^D$ is written (and the coefficients for $y_i^{(k)}$ are similarly $y_{i,j}^{(k)}$). If this is the Feldman version of the protocol, it is required that each $y_i^{(k)}$ is the all-zero polynomial.

1.2 Each server $P_i \notin Corr$ computes $\epsilon_{i,j}^{(k)} = q_{i,j}^{(k)} g + y_{i,j}^{(k)} h$. Then $P_i$ broadcasts $$VSS_{P_i} = \left(i, \{ENC_{P_m}[Q_i^{(k)}(\alpha_m), y_i^{(k)}(\alpha_m)]\}_{m=1}^n\right\}_{k=1}^{l'}\right)$$

and $$SIG_{P_i}(VSS_{P_i}).$$

1.3 Each server that did not produce a properly signed message in the previous step is added to Corr.

2. Error Detection 2.1 Each server $P_i \notin Corr$ checks for each pair $[Q_m^{(k)}(\alpha_i), y_m^{(k)}(\alpha_i)]$ received in the previous step that $Q_m^{(k)}(\alpha_i) g + y_m^{(k)}(\alpha_i) h \overset{?}{=} \sum_{j=0}^{D} \alpha_i^j \epsilon_{m,j}^{(k)}$. If this is the Feldman version of the protocol, $P_i$ also checks that $y_m^{(k)}(\alpha_i)$.

2.2 If $P_i$ detected an error in the previous step with the pair $[Q_m^{(k)}(\alpha_i), y_m^{(k)}(\alpha_i)]$, he broadcasts $ACC_{P_i} = $ i, accuse, m, k) and $SIG_{P_i}(ACC_{P_i}$. $P_i$ broadcasts an accusation no more than once for each $P_m$, although there may be more than one accusation per $k$.

2.3 If $P_i$ was accused (with a properly signed accusation) in the previous step, he broadcasts his (purported) pair of values along with the randomness $RAND_{i,m,k}$ that was used to encrypt it in step 1.2:

$$(i, defense, m\ [\ Q_i^{(k)}(\alpha_m), y_i^{(k)}(\alpha_m)\ ], RAND_{i,m,k}.$$

2.4 Each server checks to see if the defenses broadcast in step 2.3 are correct (i.e., the defense was well-formed, the pair encrypts to the same message broadcast in step 1.2 when the given randomness is used, and the pair passes the checks in step 2.1). For each accusation that was rebutted with a correct defense, the accuser is added to Corr. For each accusation that was not correctly rebutted, the accused server is added to Corr.

3. Local Share Manipulation

For each $P_i \notin Corr$ and each k, $Q_i^{(k)}$ is defined to be the all-zero polynomial. Each batch k of n polynomials will be converted into a batch of n–t polynomials as follows:

$$(R^{((k-1)(n-t)+1)}, R^{((k-1)(n-t)+2)}, \ldots,$$
$$R^{(k(n-t))}) = M(Q_1^{(k)}, Q_2^{(k)}, \ldots, Q_n^{(k)})^T.$$

The $y^{(k)}$ similarly used to construct the auxiliary polynomials for the $R^{(s)}$. Each server locally computes the Pedersen (or Feldman) commitments for these polynomials. The output is the set of shares of $\{R^{(s)}\}_{s=1}^{l}$ along with the shares of the corresponding auxiliary polynomials.

The communication complexity of GenPoly $O(l'n^2) = O(ln+n^2)$ field elements (assuming that $D=O(n)$). It takes three rounds of communication. Note that multiple instances of the GenPoly protocol can be invoked in parallel, even if the degrees of the generated polynomials are different.

(3.4.3) Secret Redistribution

The following protocol allows the servers to redistribute a secret. This re-randomizes the sharing so that old shares cannot be combined with new shares to learn the secret (thus providing security against mobile adversaries). In addition, it allows servers to correct shares they hold that may have been altered by an adversary Secret-Redistribute (t,P,Corr,[s])

It is assumed that the secret s has been correctly shared with polynomial µ and auxiliary polynomial ν (both of degree d) and that the Pedersen commitments for these polynomials are known to all servers in P.

1. Polynomial Generation

Invoke GenPoly (t,P,Corr,n+1,d–1) in parallel to generate Q and $\{R^{(j)}\}_{j=1}^{n}$ of degree d–1 with auxiliary polynomials y and $\{\zeta^{(j)}\}_{j=1}^{n}$, respectively. The $k^{th}$ coefficient of Q is $q_k$, and similarly for $R^{(j)}, y, \zeta^{(j)}$.

2. Commitment Transfer 2.1 Each $P_i \notin Corr$ broadcasts the commitments for the old secret sharing polynomial (i.e., $COM_{P_i} = \{\mu_k g + \nu_k h\}_{k=1}^{d}$ and $SIG_{P_i}(COM_{P_i})$).

2.2 Each $P_i$ determines the correct values for the commitments broadcast in the previous step by siding with the majority; $P_i$ updates its commitments accordingly.

3. Share Transfer and Interpolation 3.1 Each $P_i$ computes $\theta_{i,j} = \mu(\alpha_i) + \alpha_i Q(\alpha_i) + (\alpha_i - \alpha_j)R^{(j)}(\alpha_i)$ and $\phi_{i,j} = \nu(\alpha_i) + \alpha_i y(\alpha_i) + (\alpha_i - \alpha_j)\zeta^{(j)}(\alpha_i)$ and broadcasts $$VSS_{P_i} = (\{ENC_{P_j}[\theta_{i,j}, \phi_{i,j}]\}_{j=1}^{n}) \text{ and } SIG_{P_i}(VSS_{P_i}).$$ The idea is that for $P_j$, the servers mask µ with the polynomial $xQ(x)+(x-\alpha_j)R^{(j)}x$, and similarly for ν.

3.2 Each $P_j$ checks whether the values broadcast in step 3.1 are correct given the publicly known Pedersen commitments. That is, $P_j$ checks if $$\theta_{i,j}g + \phi_{i,j}h \stackrel{?}{=} \mu(\alpha_i)g + \nu(\alpha_i)h + \Sigma_{k=0}^{d-1}[\alpha_i^{k+1}(q_k g + y_k h) + (\alpha_i^{k+1} - \alpha_j\alpha_i^k)(r_k^{(j)}g + \zeta_k^{(j)}h)].$$

3.3 The new sharing polynomial is defined to be $\mu'(x) = \mu(x) + xQ(x)$, and similarly the new auxiliary polynomial is $\nu'(x) = \nu(x) + xy(x)$. Since $(x-\alpha_j)R^{(j)}x$ evaluates to zero at $x = \alpha_j$, $P_j$ can deduce $\mu'(\alpha_j)$ from the points on $\mu'(x) + (x-\alpha_j)R^{(j)}(x)$ sent to him by the servers (and similarly for $\nu'(\alpha_j)$). So each $P_j$ uses all the shares that passed the check in step 3.2 to interpolate his new share $\mu'(\alpha_j)$, as well as $\nu'(\alpha_j)$. The servers compute the commitments to $\mu'$ and $\nu'$ using publicly known commitments to $\mu, Q, \nu,$ and y. 4. Data Erasure Each $P_i$ erases their shares of µ, Q, ν, and y, and each $R^{(j)}$ and $\zeta^{(j)}$, along with the corresponding commitments, and sets Corr=.

The communication complexity of the Secret-Redistribute protocol is $O(n^2)$ field elements. It takes 6 rounds of communication.

(3.4.4) Secret Opening

The following protocol allows the servers to open a secret that has been shared with Pedersen commitments.

Secret-Open (t,P,[s])

It is assumed that the secret s has been shared with polynomial µ and auxiliary polynomial ν (both of degree d). If the $k^{th}$ coefficient of µ is $\mu_k$ (and similarly for $\nu_k$), then it is assumed that the Pedersen commitments $\epsilon_k = \mu_k g + \nu_k h$ for each k=0, . . . , d are publicly known.

1. Each server $P_i$ broadcasts his shares $SH_{P_i} = [\mu(\alpha_i), \nu(\alpha_i)]$ and $SIG_{P_i}(SH_{P_i})$.

2. Each server check for each pair of points $\mu(\alpha_j), \nu(\alpha_j)$ received in the previous step that $$\mu(\alpha_j)g + \nu(\alpha_j)h \stackrel{?}{=} \Sigma_{k=0}^{d} \alpha_j^k \epsilon_k.$$

3. Each server uses all the points that passed the check in step 2 to interpolate the secret $s = \mu(0)$.

The communication complexity of the Secret-Open protocol is $O(n)$ field elements. It takes one round of communication. Multiple instances of the Secret-Open protocol can be invoked in parallel while still taking only one round of communication.

(3.5) Multiplication

Multiplication triples of shared secrets need to be generated in a verifiable manner. The protocol fir generating multiplication triples in Literature Reference No. 4 uses a degree d sharing of a random number r, together with a degree 2d sharing of the same value. Using a 2d sharing would be problematic for the protocol according to the principles of the present invention, so instead two random sharings [r] and [s] are used, and when a degree 2d sharing of r is wanted, the servers locally compute $[r] + x^d[s]$.

The following protocol Multiplication-Triple (t,P,Corr, $[\alpha], [y], \{[r^{(i)}], [s^{(i)}], [\tilde{r}^{(i)}], [\tilde{s}^{(i)}]\}_{i=1}^{n}$), which is a modified version of the protocol from U.S. patent application Ser. No. 14/207,483 (which is hereby incorporated by reference as though fully set forth herein) uses the sharings $[\alpha], [y], \{[r^{(i)}], [s^{(i)}], [\tilde{r}^{(i)}], [\tilde{s}^{(i)}]\}_{i=1}^{n}$ to generate (correct) sharings [b] and [c] such that c=ab.

Multiplication-Triple $$(t, P, Corr, [\alpha], [y], \{[r^{(i)}], [s^{(i)}], [\tilde{r}^{(i)}], [\tilde{s}^{(i)}]\}_{i=1}^{n})$$

In what follows, the capital letter for the polynomial that shares the secret represented by the corresponding small letter (i.e., $A(0) = \alpha, R^{(i)}(0) = r^{(i)}$, etc.) is used. The auxiliary polynomials will have overlines (e.g., the auxiliary polynomial for A is $\overline{A}$). The following steps are performed in parallel for each server $P_i \notin Corr$.

1. Generating Multiplicands $P_i$ randomly chooses two values $b^{(i)}$ and $\tilde{b}^{(i)}$ then invokes Secret-Share $(t,P_i,b^{(i)},P,Corr)$ and Secret-Share $(t,P_i,\tilde{b}^{(i)},P,Corr)$ in parallel. The polynomial used to share $b^{(i)}$, is denoted by $B^{(i)}$ (with auxiliary polynomial $\overline{B}^{(i)}$), and the polynomial used to share $\tilde{b}^{(i)}$ is denoted by $\tilde{B}^{(i)}$ (with auxiliary polynomial $\overline{\tilde{B}}^{(i)}$). If $P_i$ is added to Corr in the invocation of Secret-Share, then the following steps are not performed for $P_i$.

2. Opening Masked Products 2.1 Each server $P_i \notin Corr$ broadcasts shares of $[\alpha]$ $\left[ b^{(i)} \right] + \left[ r^{(i)} \right] + x^d [s^{(i)}]$ and $[y]$, together with corresponding shares of auxiliary polynomials:

$$\theta_j = A(\alpha_j) B^{(i)}(\alpha_j) + R^{(i)}(\alpha_j) + \alpha_j{}^d S^{(i)}(\alpha_j),$$

$$\phi_j = \overline{A}(\alpha_j) B^{(i)}(\alpha_j) + \overline{R}^{(i)}(\alpha_j) + \alpha_j{}^d \overline{S}^{(i)}(\alpha_j), Y(\alpha_j), \overline{Y}(\alpha_j),$$
$$SIG_{P_j}(\theta_j, \phi_j, Y(\alpha_j), \overline{Y}(\alpha_j)).$$

The shares of $[y]$ are not used until step 5.3. They are broadcast here simply to reduce round complexity.

2.2 $P_i$ checks for each $(\theta_j, \phi_j)$ broadcast in the previous step that $$\theta_j g 30 \ \phi_j h? = B^{(i)}(\alpha_j)(A(\alpha_j)g + \overline{A}(\alpha_j)h + (R^{(i)}(\alpha_j)g + \overline{R}^{(i)}(\alpha_j)h + \alpha_j{}^d (S^{(i)})(\alpha_j)g + \overline{S}^{(i)}(\alpha_j)h).$$

Recall that $P_i$ can compute the Pedersen commitments to $P_j$'s shares of $\alpha, r^{(i)}$), and $S^{(i)}$ using the publicly known commitments.

2.3 For any pair $(\theta_j, \phi_j)$ that did not pass the check in the previous step, $P_i$ broadcasts $$ACC_{P_i} = (P_i, accuse, P_j B^{(i)}(\alpha_j), \overline{B}^{(i)}(\alpha_j), RAND_{i,j})$$

and $$SIG_{P_i}(ACC_{P_i}),$$

where $RAND_{i,j}$ is the randomness used to encrypt $P_j$'s shares in the invocation of Secret-Share in step 1.

2.4 If $P_i$ broadcasts a correct accusation against $P_j$, (i.e., the values encrypt to the same message sent in the invocation of Secret-Share in step 1 when the given randomness is used, and these values do not correspond to the values $(\theta_j, \phi_j)$ broadcast in step 2.1) then $j$ is added to Corr. If $P_i$ broadcasts an incorrect accusation against $P_j$, then $P_i$ is added to Corr.

3. Revealing Corrupt Servers' Shares 3.1 The servers invoke one instance of GenPoly $(t,P,Corr, 3n,d-|Corr|)$ (i.e., this step is not run for each $P_i$, but rather once for all the $P_i$). This generates polynomials $M_1^{(i)}, M_2^{(i)}, M_3^{(i)}$ with auxiliary polynomials $\overline{M}_1^{(i)}, \overline{M}_2^{(i)}, \overline{M}_3^{(i)}$.

3.2 The polynomials $W_e^{(i)}, \overline{W}_e^{(i)}$, are defined by $W_e^{(i)}(x) = M_e^{(i)}(x) \Pi_{P_k \in Corr}(x - \alpha_k)$ and $\overline{W}_e^{(i)}(x) = \overline{M}_e^{(i)}(x) \Pi_{P_k \in Corr}(x - \alpha_k)$. Each server $P_j$ broadcasts $$SH_j = [W_1^{(i)}(\alpha_j) + A(\alpha_j), W_2^{(i)}(\alpha_j) + R^{(i)}(\alpha_j), W_3^{(i)}(\alpha_j) + S^{(i)}(\alpha_j) \overline{W}_1^{(i)}(\alpha_j) + \overline{A}(\alpha_j), \overline{W}_2^{(i)}(\alpha_j) + \overline{R}^{(i)}(\alpha_j),$$
$$\overline{W}_3^{(i)}(\alpha_j) + \overline{S}^{(i)}(\alpha_j)]$$

and $SIG_{P_j}(SH_j)$.

3.3 In parallel with the previous step, $P_i$ broadcasts $CorSh_{P_i} = \{B^{(i)}(\alpha_k)\}_{P_k \in Corr}$ along with $SIG_{P_i}(CorSh_{P_i})$.

3.4 Each server checks for each pair broadcast in step 3.2 that it corresponds to the publicly known Pedersen commitments. The shares that pass the check are used to interpolate the shares of $[\alpha],[r^{(i)}]$, and $[s^{(i)}]$ belonging to servers in Corr, and together with the shares broadcast in the previous step, these are used to compute the corrupt servers' shares of $\alpha b^{(i)} + r^{(i)}$.

4. Steps 2 and 3 are also performed to distribute and check shares of $[\alpha] \left[ \tilde{b}^{(i)} \right] + \left[ \tilde{r}^{(i)} \right] + x^d [\tilde{s}^{(i)}]$. The two executions of these steps are to be performed in parallel.

5. Checking Multiplication Triples 5.1 Each server interpolates $D^{(i)} = \alpha b^{(i)} + r^{(i)}$ and $\tilde{D}^{(i)} = \alpha \tilde{b}^{(i)} + \tilde{r}^{(i)}$ from the shares of all servers not in Corr that were broadcast in step 2.1 and the shares of servers in Corr that were computed in step 3.4.

5.2 Each server locally computes $\left[ c^{(i)} \right] = D^{(i)} - \left[ r^{(i)} \right]$ and $\left[ \tilde{c}^{(i)} \right] = \tilde{D}^{(i)} - [\tilde{r}^{(i)}]$.

5.3 The servers interpolate $y$ from the shares broadcast in step 2.1 that correctly correspond to the commitments.

5.4 Invoke Secret-Open $(t,P, \left[ \tilde{b}^{(i)} \right] + y \left[ b^{(i)} \right] )$ to get $\hat{b}^{(i)} = \tilde{b}^{(i)} + y b^{(i)}$.

5.5 Invoke Secret-Open $(t,P, \left[ \tilde{c}^{(i)} \right] + y \left[ c^{(i)} \right] - \hat{b}^{(i)}[\alpha])$ to get $z^i = \tilde{c}^{(i)} + y c^{(i)} - \hat{b}^{(i)} \alpha$.

5.6 If $z^{(i)} \neq 0$, then $P_i$ is added to Corr.

$[b] = \Sigma[b^i]$ and $[c] = \Sigma \left[ c^{(i)} \right]$ are defined, where the sums are taken over all $i$ such that $P_i \notin Corr$. The servers locally compute these sharings (along with their Pedersen commitments), and the multiplication triple is taken to be $([\alpha],[b],[c])$ with $c = \alpha b$.

The communication complexity of the Multiplication-Triple protocol is $O(n^2)$. It takes 11 rounds of communication.

The following protocol computes a sharing of $xy$ given a sharing of $x$ and a sharing of $y$. It uses the Multiplication-Triple protocol as a subprotocol and employs Beaver's multiplication technique. Beaver's multiplication technique is described in Literature Reference No. 1. Multiplication is used as a subprotocol in the Robust-Sig-Gen protocol.

Multiply $(t,P,Corr,[x],[y])$

1. The servers invoke GenPoly $(t,P,Corr,2+4n,d)$ to generate $2+4n$ sharings of random values.
2. The servers invoke Multiplication-Triple using the $2+4n$ random sharings generated in the previous step as input; denote the output triple as $([\alpha],[b],[c])$ with $c = \alpha b$.
3. The servers locally compute $[\alpha] = [x] + [\alpha]$ and $[\beta] = [y] + [b]$.
4. Invoke Secret-Open $(t,P,[\alpha])$ and Secret-Open $(t,P,[\beta])$ in parallel.
5. The servers locally compute the output of the protocol as $[xy] = \alpha\beta - \alpha[b] - \beta[\alpha] + [c]$.

The communication complexity of the Multiply protocol is $O(n^2)$. It takes 15 rounds of communication.

Computing the ECDSA signatures in a distributed manner according to the principles of the present invention guarantees significantly increasing security, because it eliminates a single point of failure/compromise (i.e., a single server) as an adversary/attacker must compromise multiple servers in order to retrieve the private key used to compute the digital signature or affect its computation. In addition, such a compromise has to occur between two proactive refresh cycles, because all information obtained from servers in previous cycles will be irrelevant when a proactive refresh cycle is executed as new randomized shares of the keys are generated. These new shares cannot be used with old ones to reconstruct the private key.

ECDSA signatures, standardized in the FEDERAL INFORMATION PROCESSING STANDARDS PUBLICATION, FIPS PUB 186-4: Digital Signature Standard (DSS) (see Literature Reference No. 5), are used to generate digital signatures which ensure integrity of transmitted data online, can be used for authentication of data and entities online, and are also used in a variety of digital currency and financial transactions (e.g., Bitcoin, Litecoin, Ripple, and others digital currencies). The present invention, thus, has a large set of applications to which it could be applied.

For instance, companies can use the present invention to design and implement remote access to Internet-enabled/ connected vehicles. Individuals who have access to the vehicle can do so without risk of compromise of their private keys, which can be stored in a distributed manner on a user's mobile device(s), security token and/or backend servers. If a user's device or backend server, or the operator thereof, is compromised, the private key will not be revealed. Requiring a private key for authentication will guarantee that individuals without proper access will not be able to access the vehicle. In addition to the private key, a biometric (e.g., fingerprint, palm vein scan) can also be stored in a distributed manner, and both an ECDSA-based digital signature and biometric data can be used for authentication.

Additionally, future connected vehicles may require Public Key Certificates in their operation. Manufacturers will need to generate such certificates and load them into vehicles. Those certificates have to be signed by a manufacturer's private key (or multiple keys) which have to be stored securely. The system according to the principles of the present invention would allow a manufacturer and/or it's supplier to secure the private keys and compute such signatures in a distributed manner. The ability to efficiently perform distributed computations using secret shared private keys is a very important step to securing future infrastructure of connected vehicles.

Further, companies can utilize the system described herein for facility access to extremely sensitive facilities. Such facilities may not wish to store lists of individuals who may access particular rooms, such as sensitive compartmented information facilities (SCIFs). The present invention will allow only authorized users to access such facilities without storing their entire identifying information and private key at the facility.

What is claimed is:

1. A system for generation of elliptic curve digital signature algorithm (ECDSA) based digital signatures, the system comprising:
one or more processors and a non-transitory computer-readable medium having executable instructions encoded thereon such that when executed, the one or more processors perform operations of:
initializing a Secret-Share protocol between a client C and a set of n servers, wherein the client C shares a set of shares of a private key s among the set of n servers;
initializing, by the set of n servers, a protocol to generate a digital signature on a message m using the set of shares of the private key s without reconstructing or revealing the private key s;
periodically initializing, by the set of n servers, a Secret-Redistribute protocol on each share of the private key s to re-randomize the set of shares; and
wherein a threshold t of up to n/2 of the set of n servers can be completely corrupted or compromised by an active adversary while the confidentiality of the private key s and correctness of the digital signature remain uncompromised.

2. The system as set forth in claim 1, wherein the one or more processors further perform an operation of initializing a Secret-Open protocol to reveal the private key s to an intended recipient, wherein the private key s is used to compute the digital signature.

3. The system as set forth in claim 2, wherein in order for an adversary to retrieve the private key s, the adversary must compromise a plurality of servers in the set of n servers.

4. The system as set forth in claim 3, wherein if a majority of the set of shares of the private key s is not corrupted, then the set of n servers jointly restore any corrupted shares.

5. The system as set forth in claim 4, wherein corrupted servers are restored to an uncorrupted state.

6. A computer-implemented method for generation of elliptic curve digital signature algorithm (ECDSA) based digital signatures, comprising:
an act of causing one or more processors to execute instructions stored on a non-transitory memory such that upon execution, the one or more processors perform operations of:
initializing a Secret-Share protocol between a client C and a set of n servers, wherein the client C shares a set of shares of a private key s among the set of n servers;
initializing, by the set of n servers, a protocol to generate a digital signature on a message m using the set of shares of the private key s without reconstructing or revealing the private key s; and
periodically initializing, by the set of n servers, a Secret-Redistribute protocol on each share of the private key s to re-randomize the set of shares; and
wherein a threshold t of up to n/2 of the set of n servers can be completely corrupted or compromised by an active adversary while the confidentiality of the private key s and correctness of the digital signature remain uncompromised.

7. The method as set forth in claim 6, wherein the one or more processors further perform an operation of initializing a Secret-Open protocol to reveal the private key s to an intended recipient, wherein the private key s is used to compute the digital signature.

8. The method as set forth in claim 7, wherein in order for an adversary to retrieve the private key s, the adversary must compromise a plurality of servers in the set of n servers.

9. The method as set forth in claim 8, wherein if a majority of the set of shares of the private key s is not corrupted, then the set of n servers jointly restore any corrupted shares.

10. The method as set forth in claim 9, wherein corrupted servers are restored to an uncorrupted state.

11. A computer program product for generation of elliptic curve digital signature algorithm (ECDSA) based digital signatures, the computer program product comprising:
computer-readable instructions stored on a non-transitory computer-readable medium that are executable by a computer having one or more processors for causing the one or more processors to perform operations of:
initializing a Secret-Share protocol between a client C and a set of n servers, wherein the client C shares a set of shares of a private key s among the set of n servers:.
initializing, by the set of n servers, a protocol to generate a digital signature on a message m using the set of shares of the private key s without reconstructing or revealing the private key s; and
periodically initializing, by the set of n servers, a Secret-Redistribute protocol on each share of the private key s to re-randomize the set of shares; and
wherein a threshold t of up to n/2 the set of n servers can be completely corrupted or compromised by an active adversary while the confidentiality of the private key s and correctness of the digital signature remain uncompromised.

12. The computer program product as set forth in claim 11, further comprising instructions for causing the one or more processors to perform an operation of initializing a Secret-Open protocol to reveal the private key s to an intended recipient, wherein the private key s is used to compute the digital signature.

13. The computer program product as set forth in claim 12, wherein in order for an adversary to retrieve the private key s, the adversary must compromise a plurality of servers in the set of n servers.

14. The computer program product as set forth in claim 13, wherein if a majority of the set of shares of the private key s is not corrupted, then the set of n servers jointly restore any corrupted shares.

15. The computer program product as set forth in claim 14, wherein corrupted servers are restored to an uncorrupted state.

* * * * *